(12) United States Patent
Beresinski (10) Patent No.: US 9,375,882 B2
(45) Date of Patent: Jun. 28, 2016

(54) METHOD FOR FORMING A STRUCTURAL COMPONENT OF AN AIRCRAFT OR SPACECRAFT, AND FORMING DEVICE

(75) Inventor: Marek Beresinski, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 63 days.

(21) Appl. No.: 13/483,561

(22) Filed: May 30, 2012

(65) Prior Publication Data

US 2012/0292448 A1 Nov. 22, 2012

Related U.S. Application Data (63) Continuation of application No. PCT/EP2010/068138, filed on Nov. 24, 2010.

(60) Provisional application No. 61/265,478, filed on Dec. 1, 2009.

(30) Foreign Application Priority Data

Dec. 1, 2009 (DE) .......................... 10 2009 047 340

(51) Int. Cl.
*B29C 70/22* (2006.01)
*B29C 70/54* (2006.01)
*B29D 99/00* (2010.01)

(52) U.S. Cl.
CPC ............ *B29C 70/222* (2013.01); *B29C 70/545* (2013.01); *B29D 99/0003* (2013.01); *B29C 2793/0081* (2013.01); *Y02T 50/433* (2013.01); *Y10T 29/49622* (2015.01); *Y10T 29/51* (2015.01)

(58) Field of Classification Search
CPC ............ B62D 1/04; B62D 7/01; B23D 19/06; B23D 33/02; B29C 70/222; B29C 70/545; B29C 2793/0081; B29F 99/003

USPC ........ 72/324, 326, 335, 363, 464; 83/56, 614; 156/251, 515; 425/302.1, 305.1

See application file for complete search history.

(56) References Cited

U.S. PATENT DOCUMENTS 518,766 A * 4/1894 Plecker ........................... 72/326
3,713,357 A * 1/1973 Keith .............................. 83/861

(Continued)

FOREIGN PATENT DOCUMENTS

| DE | 689 18 186 | 1/1995 |
|---|---|---|
| DE | 199 15 083 | 4/2000 |
| DE | 102 51 581 | 10/2003 |
| DE | 103 26 422 | 1/2005 |
| JP | 2001-310393 | 4/2000 |

OTHER PUBLICATIONS

German Office Action for Application Serial No. DE 10 2009 047 340.8-26 dated Aug. 25, 2010.

(Continued)

*Primary Examiner* — Teresa M Ekiert
(74) *Attorney, Agent, or Firm* — Jenkins, Wilson, Taylor & Hunt, P.A.

(57) ABSTRACT

In a method for forming a structural component of an aircraft or spacecraft a preform comprising at least one band is formed by means of braiding around a core. A severing cut is introduced at least in portions into the at least one band of the preform to form two band portions of the at least one band. The two formed band portions of the at least one band are then deformed into a predetermined shape by means of a deformation tool which can be guided along the severing cut. A deformation device is used to carry out the method. A structural component is produced by means of the method and/or the deformation device.

4 Claims, 7 Drawing Sheets

(56) References Cited

U.S. PATENT DOCUMENTS

| | | | | |
|---|---|---|---|---|
| 3,822,160 A | * | 7/1974 | La Barge | 156/251 |
| 4,227,396 A | * | 10/1980 | Crowe | 72/469 |
| 4,974,436 A | * | 12/1990 | Nakatsuji | 72/326 |
| 5,937,725 A | * | 8/1999 | Kamijo et al. | 83/56 |
| 6,527,894 B1 | | 3/2003 | Rocker et al. | |
| 6,863,767 B2 | | 3/2005 | Bersuch et al. | |
| 6,928,911 B1 | * | 8/2005 | Ratkus et al. | 83/56 |
| 2004/0219251 A1 | | 11/2004 | Eberth et al. | |

OTHER PUBLICATIONS

International Search Report for Application Serial No. PCT/EP2010/068138 dated Mar. 10, 2011.

Chinese Office Action for Application No. 201080054462.1 dated Jan. 28, 2014.

* cited by examiner

METHOD FOR FORMING A STRUCTURAL COMPONENT OF AN AIRCRAFT OR SPACECRAFT, AND FORMING DEVICE

CROSS-REFERENCE TO RELATED APPLICATIONS

This application is a continuation of and claims priority to PCT/EP2010/068138 filed Nov. 24, 2010 which claims the benefit of and priority to U.S. Provisional Application No. 61/265,478, filed Dec. 1, 2009 and German Patent Application No. 10 2009 047 340.8 filed Dec. 1, 2009, the entire disclosures of which are herein incorporated by reference.

FIELD OF THE INVENTION

The present invention relates to a method for forming a structural component of an aircraft or spacecraft and also to a deformation device.

Although it is applicable to structural components with any fibrous materials, the present invention and the problem forming the basis thereof will subsequently be explained in more detail with reference to profiled components made from carbon fibre-reinforced plastics (CFRP) components, e.g. frame profiles of an aeroplane.

The stiffening of other CFRP components, e.g. outer skins with CFRP stringers and CFRP frames in order to withstand the high loads encountered in the aeroplane sector, while adding the least possible weight is generally known. Different profile types are used, e.g. C-, Ω- and Z-shaped profiles and the like.

The following description relates to braided profiles. Current braiding technology permits the production of braided work characterised by closed cross-sections. For example, a core, e.g. having a rectangular profile, thus has fibres braided around it, thus producing braided work layers. Between these braided work layers, band layers, e.g. unidirectional fibre fabrics, are then laid down in band regions, in the longitudinal direction of the core. A braided hollow profile, e.g. a rectangular pipe with a closed cross-section, is therefore produced.

In order to produce so-called C-shaped profiles, this rectangular profile is then divided in a plane on its longitudinal axis in such a way that two C-shaped profiles are created.

Current braiding technology thus also permits the production of curved C-shaped preforms. The term preform is to be understood to mean a so-called preform or textile fibre preform which is subsequently impregnated with a matrix and is then hardened e.g. in an autoclave.

The braiding process can be largely automated, and by using CNC technology it is possible to produce profiles with a non-constant cross-section. However, since frames with a so-called Z-shaped profile are also being used more and more frequently in aircraft and spacecraft fuselage construction, there is a need also to produce them in an automated manner. However, this has thus far not been possible using braiding technology since it is possible to braid around only closed cross-sections.

SUMMARY OF THE INVENTION

Against this background it is the object of the present invention to provide an improved method for forming a structural component of an aircraft or spacecraft. A further object is to provide a corresponding deformation device.

Accordingly, in the case of a method for forming a structural component of an aircraft or spacecraft, a preform having at least one band is formed by braiding around a core. A severing cut is introduced at least in portions into the at least one band of the preform in order to form two band portions of the at least one band. By means of a deformation tool which can be guided along the severing cut, the two formed band portions of the at least one band are deformed into a predetermined shape. A deformation device is used to carry out the method. A structural component is produced according to the method and/or by means of the deformation device.

Furthermore, a deformation device is provided to form a structural component of an aircraft or spacecraft. It comprises the following:

a tool body which has a receiver to receive a braided preform having at least one band;

at least one cutting device to introduce a severing cut at least in portions into the at least one band of the preform in order to form two band portions of the at least one band; and at least one deformation tool which can be guided along the severing cut to deform the two formed band portions of the at least one band into a predetermined shape.

Therefore the present invention has the advantage over the approaches mentioned at the beginning that the automated braiding technique can also be applied to produce profiles with all their advantages, which could not previously be produced by braiding technology.

Advantageous embodiments and improvements of the present invention are found in the subordinate claims.

A fundamental idea behind the invention consists of using simple processing, e.g. introduction of a severing cut into a preform, as preparation for deforming this in such a way that a new profile is produced from the initial profile.

In the case of such a deformation or transformation of a braided preform, e.g. from a preform for a C-shaped profile into a Z-shaped profile, the retention of the fibre orientation in the relevant layers to be deformed is of great significance. In the case of curved profiles it is important to decide which of the bands is deformed. For example, in the case of a frame with an outer diameter and an inner diameter, the inner band is to be understood as the band with the smaller diameter and the outer band is to be understood as the band with the larger diameter. In the outer band the fibres are forced to conform to the large radius during deformation, i.e. they are pulled. In the case of a plurality of layers and a fibre orientation of ±45° or 90°, this can lead to local gaps in the fibres. As soon as the fibres are at 0° between the diagonals, they will attempt to move inwards during the deformation because the length of the fibre remains the same. However, when the inner band is deformed, the fibres are then compressed, which can lead to local folding during the deformation process. The change in the transition radius in the individual layers can also lead to displacements between the layers, i.e. it must be made possible for the layers to be able to be displaced with respect to each other without causing undulations in the fibre. This again means that when multi-layer preforms are being deformed at the same time, the layers should slide on each other without becoming caught against each other. The displacement between the layers leads, on the band concerned, to the so-called book effect, i.e. at that location an edge is built up in a stacked manner.

It is also possible for a cross-section, e.g. a triangular cross-section, of a preform to have only one band.

For this purpose, the invention makes provision for the core to have at least two braided work layers braided around it, wherein the at least one band is provided with separating layers between every two braided work layers. In so doing, it is advantageous if these separating layers are formed e.g. from separating film.

By mechanically folding over band portions, i.e. of braided work parts or portions of braided work layers, it is possible, amongst other things, to produce the geometries which have previously not been achievable by braiding. Thus the production of Z-shaped profiles with variable cross-sections can also be implemented.

In the case of preforms with more than one band, e.g. with an outer band and an inner band, it is possible not only for the outer band but also for the inner band to be deformed. Thus the braided work produced on the basis of individual preforms can also yield a plurality of components which are easily distinguishable from each other since the final geometry is determined only during deformation.

It is preferred if the deformation takes place by folding over the formed band portions layer by layer. In this way any risk of gaps and flaws in the fibres is considerably reduced. It is important that the fibres of the braided work layers retain their fibre orientation during deformation and are not damaged by the deformation tool. For this purpose, the separating layers also offer the advantage that they protect the fibres to be deformed against damage, e.g. by the deformation tool during deformation. They also make possible easy mutual separation of the individual layers during layer-by-layer folding over.

The respective separating layers are removed after each layer-by-layer folding over of band portions and are replaced by previously prepared band layers, e.g. of unidirectional (UD) fibre fabrics which are then fixed. This can be carried out e.g. by a removal device which cooperates with a laying device or is disposed together therewith.

By means of the deformation, components with concave surfaces or convex surfaces can also be produced, which was not previously possible by braiding. For example, for this purpose a tool body of the deformation device can have corresponding concave and/or convex portions in the region of the layer portions to be deformed, wherein the deformation tool can be fitted with corresponding pressing devices, e.g. pressing rollers, for this purpose.

After band portions have been folded over, a deformed preform is thus created. In this preform, another band or even another predetermined portion can be severed in the longitudinal direction of the deformed preform in order to obtain two mutually separated deformed preforms. Thus it is possible to produce an Ω-shaped profile e.g. from a braided rectangular profile by first severing the inner band and deforming the associated band portions. By severing the other band a second time, two Z-shaped profiles are then obtained.

The whole process can advantageously take place almost completely automatically, whereby the prerequisites for industrial implementation are fulfilled. This deformation technique opens up entirely new possible applications for the braiding process with its own advantages since a pure semi-finished product is produced by the braiding process, acquiring its final geometry only after deformation.

In order to replace the separating layers, the deformation device has at least one removal device for removing the separating layers and a laying device for laying band layer portions on the deformed preform. The laying device can at the same time be combined with a removal device for the separating layers, wherein automatic sequence of the method is advantageously accelerated.

It is important that the braided work layers are not raised too high during the deformation, since otherwise either local folds or local gaps can appear. For this reason provision is made for the deformation tool to be in the form of a plough or a snowplough with lateral deformation surfaces which taper towards each other in the longitudinal direction of the deformation tool at a predetermined angle, wherein they are connected at a front face of the deformation tool in a cutting edge.

For this purpose, the deformation surface of the deformation tool can have a web with at least one channel, wherein the channel merges at its upper end into a guide surface. The channel radius is relatively small. Because of this, folds and local gaps cannot occur. The deformation surfaces of the deformation tool are appropriately designed to effect a predetermined deformation in the portions of the preform which are to be deformed. For this purpose, provision can be made e.g. for the deformation surface of the deformation tool to be formed in such a way that spacing between fibres of the portions of the preform, which are to be deformed, at a centre axis of the preform is minimal during the deformation process.

In a further embodiment of the deformation device the deformation tool can comprise the cutting device. For example, this cutting device can be attached into the web at the front face of the deformation tool by this edge being formed as the cutting edge. During forwards movement of the deformation tool, the cutting edge will first sever the braided work layer of the band and then fold it over. The band or braided work layer thereof to be severed can also be scored by a pre-cutter in order to facilitate the cutting process.

A structural component for air and space travel is produced according to the above-described method and/or by means of the deformation device explained above.

BRIEF DESCRIPTION OF THE DRAWINGS

The invention will be explained in more detail hereinunder with the aid of exemplified embodiments with reference to the attached figures of the drawing in which.

DESCRIPTION OF EXEMPLARY EMBODIMENTS

In the figures, like reference numerals designate like or functionally equivalent components unless stated to the contrary. Coordinates x, y and z serve to facilitate orientation.

The addition of "-1" and "-2" in the case of like reference numerals indicates that opposing portions or parts are referred to.

Figure 1:
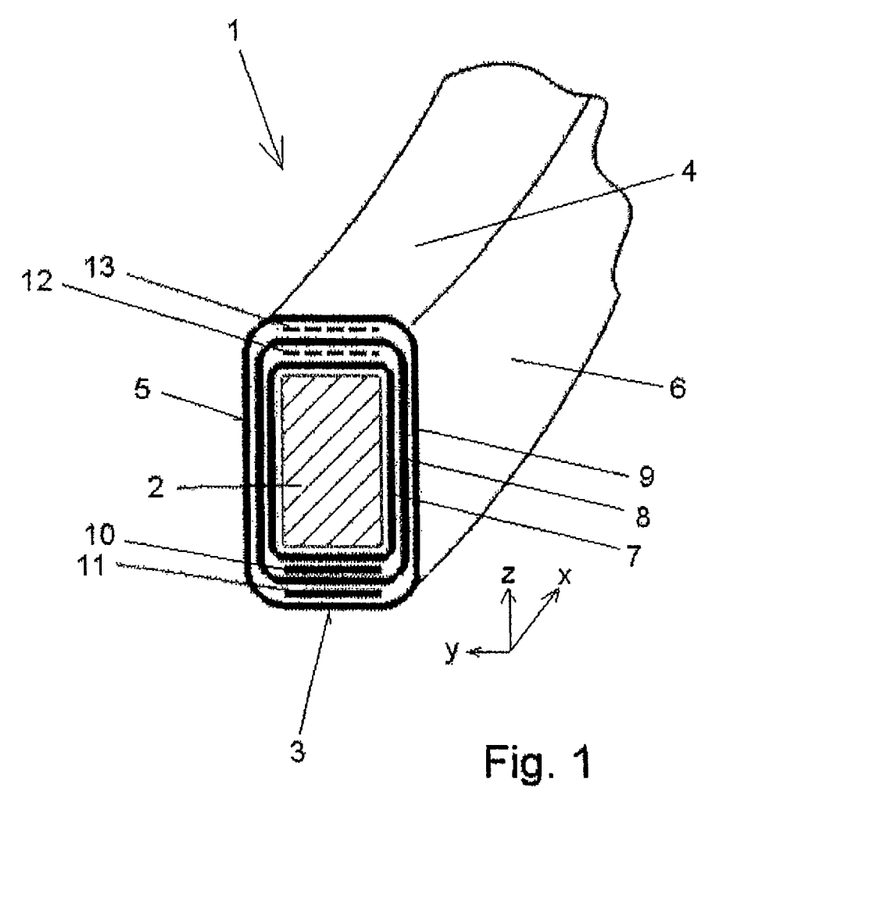
FIG. 1 illustrates a schematic, perspective, cross-sectional view of a preform in accordance with one exemplified embodiment for explanation of a method in accordance with the invention.

FIG. 1 shows a schematic, perspective cross-sectional view of a preform 1 in accordance with an exemplified embodiment for explanation of a method in accordance with the invention. In a first method step, the preform 1 is produced in a braiding process. In so doing, a core 2, in this case with a rectangular cross-section, has fibres braided around it, wherein in this example a three-layer preform 1 is produced. In this case diagonal layers are produced, e.g. as biaxial or UD braided work (UD indicates unidirectional), wherein a first internal braided work layer 7 lies directly on the core 2. A middle braided work layer 8 is wound thereon and has an outer braided work layer 9 braided around it.

The preform 1 has a curved structure as shown in FIG. 1. It has bands 3 and 4, wherein the band 4 is also designated as the inner band and the band 3 as the outer band. These bands are connected by profile webs 5, 6. After the braiding of the inner braided work layer 7, a first band layer 10 of UD fabric is laid on the outer band 3 in the longitudinal direction of the preform 1, i.e. in the x-direction. In this example, the inner band 4 is provided for a deformation which is prepared for by a severing cut 17 (see FIG. 2). A separating layer 12 instead of a band layer is placed on the inner band 4. The separating layer can be e.g. a separating film. In the same manner, a second band layer 11 is placed between the middle braided work layer 8 and the outer braided work layer 9 on the outer band 4, and a second separating layer 13 is placed on the inner band 3. The outer braided work layer 9 is then applied. The separating layers 12, 13 simulate the thickness of the band layers 10, 11 on this side of the inner band 4, so that a uniform structure for the preform 1 is achieved.

The preform 1 is now produced as a braided component with a closed cross-section in the braided work layers 7 to 9. The braiding is effected in an appropriate braiding device with individual fibres, multiple fibres and/or fibre bundles or the like.

Figure 2:
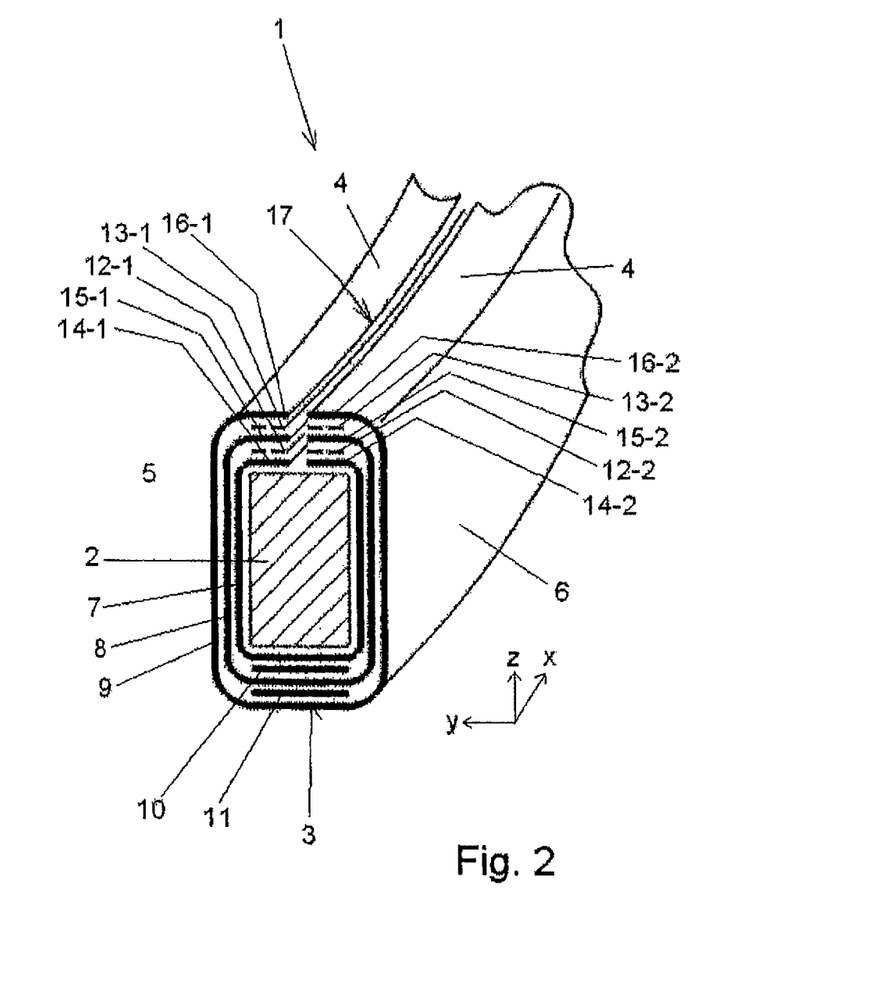
FIG. 2 illustrates the preform of FIG. 1 after a further step of the method in accordance with the invention.

The preform 1 thus produced is then processed in a second method step, illustrated in FIG. 2, with a cutting device, which can be a component of a deformation device 30 (see FIG. 3), in such a way that the inner band 4 is provided with a severing cut 17 in the longitudinal direction x of the preform 1. The severing cut 17 can be effected through all braided work layers 7 to 9 at the same time. However, it is also possible for the severing cut 17 to be formed layer by layer. The severing cut 17 can also be effected at any location using a suitable cutting device.

By means of the severing cut 17 the band 4, in this case the inner band 4, is divided into two band portions per braided work layer in each case, namely: two inner layer band portions 14-1 and 14-2, two middle layer band portions 15-1 and 15-2, and two outer layer band portions 16-1 and 16-2. The separating layers 12 and 13 are also each divided into separating layer portions 12-1 and 12-2 and 13-1 and 13-2.

Figure 3:
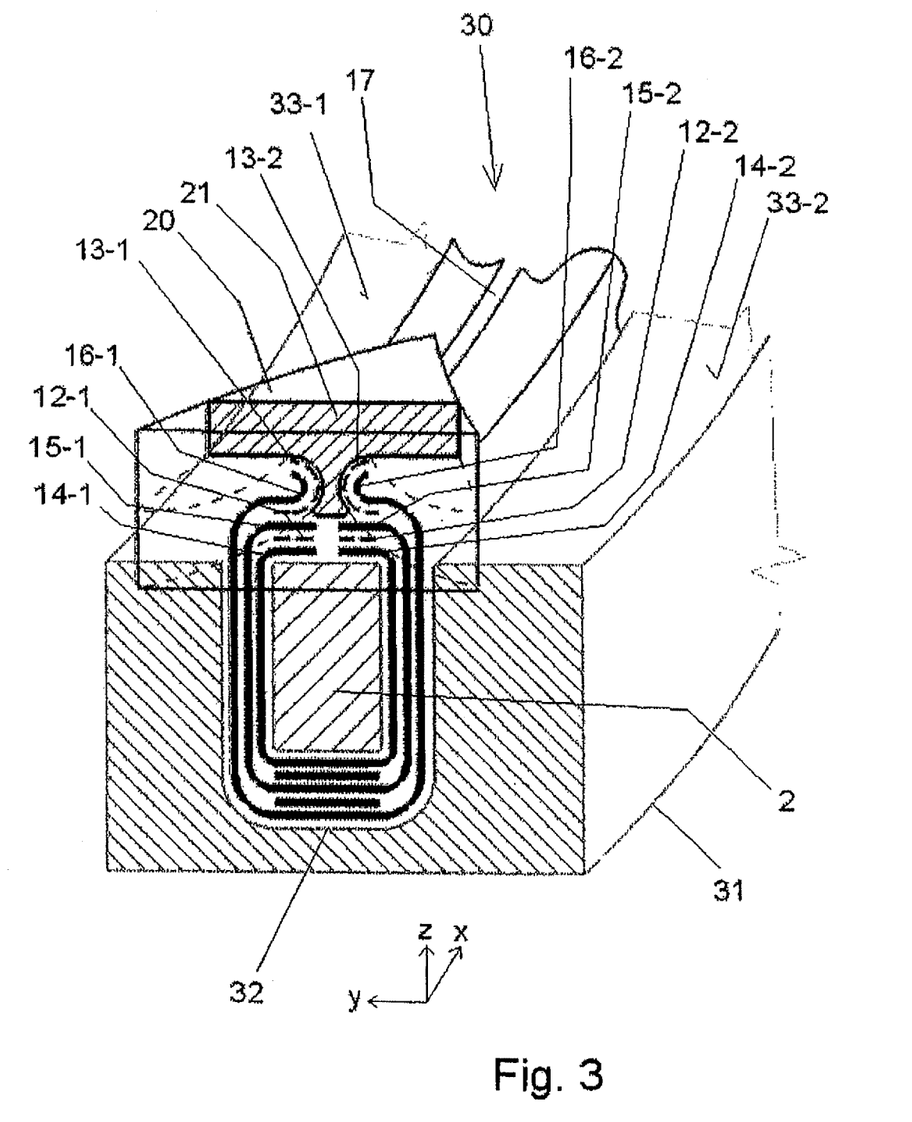
FIG. 3 illustrates the preform of FIG. 2 after a further step of the method in accordance with the invention with an exemplified embodiment of a deformation device in accordance with the invention.

FIG. 3 shows that in a further step of the method in accordance with the invention, the preform 1 of FIG. 2 is received in a deformation device 30, shown as a possible exemplified embodiment of a deformation device 30 in accordance with the invention.

Figure 6:
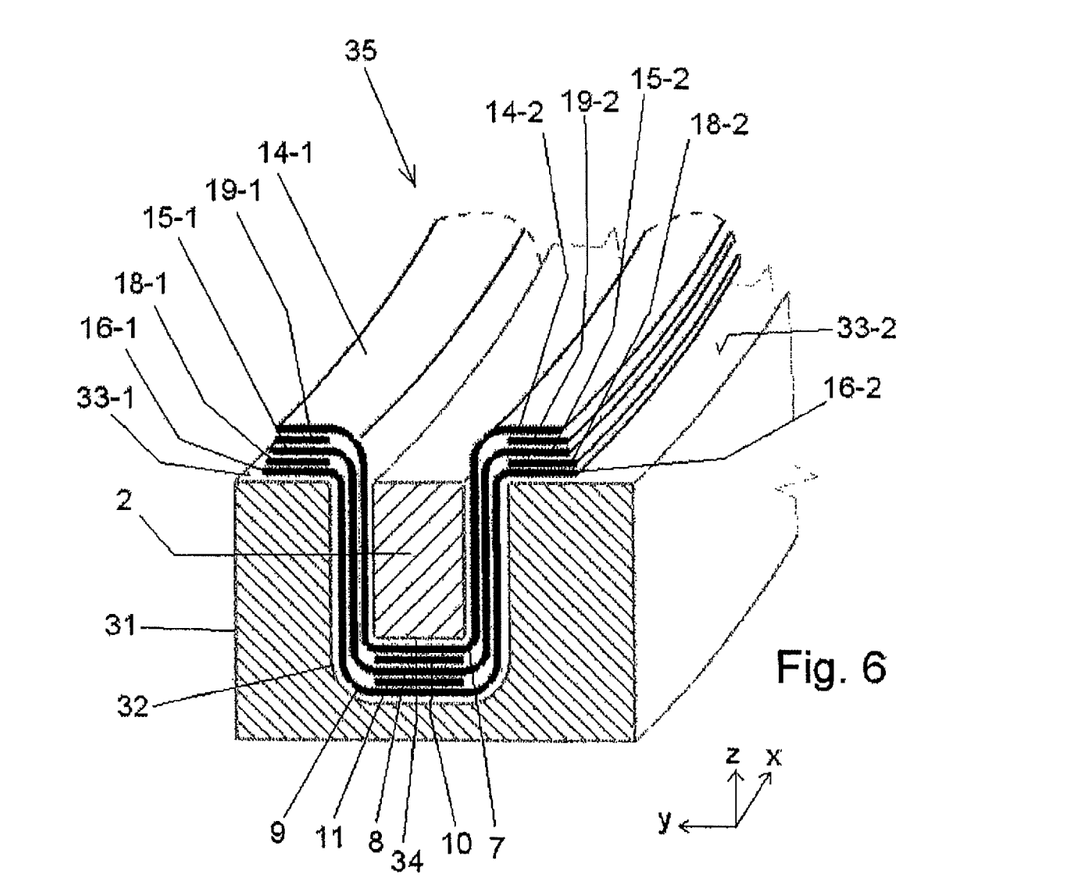
FIG. 6 illustrates the deformed preform of FIG. 5 after a further step of the method in accordance with the invention in the deformation device in accordance with the invention.
Figure 7:
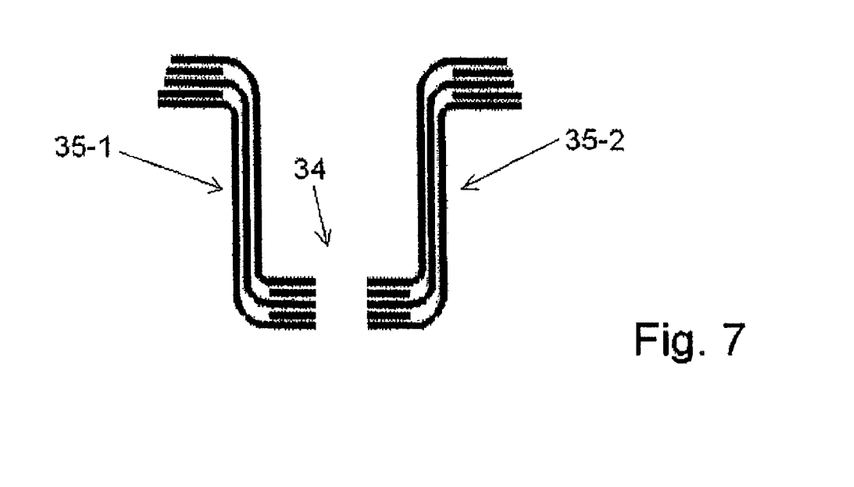
FIG. 7 illustrates a schematic sectional view of a severed, deformed preform.

In this case the deformation device 30 has a tool body 31 with a receiver 32 which has a respective tool upper side 33-1 and 33-2 on both sides in the longitudinal direction x. The preform 1 is inserted with its core 2 into the receiver 32. The inner band 4 prepared for deformation by the severing cut 17 protrudes upwards with its divided band portions 14-1, 14-2, 15-1, 15-2, 16-1 and 16-2 out of the receiver 32. A deformation tool 20, which is explained in more detail hereinunder, is disposed so as to be guided in the x-direction, i.e. in the longitudinal direction of the tool 31 and of the preform 1, and is introduced with its front part (see FIG. 4d) into the severing cut 17 in the outer braided work layer 9 between the outer layer band portions 16-1 and 16-2. The outer layer band portions 16-1 and 16-2 together with the second separating layer 13-1 and 13-2 are each deformed by a deformation cross-section 21 of the deformation tool 20. The deformation cross-section 21 is in this case shown only by way of example at a specific x-position in the longitudinal direction of the deformation tool 20. The outer layer band portions 16-1 and 16-2 are guided and deformed together with the second separating layer 13-1 and 13-2 in each case by deformation surfaces 26-1 and 26-2 (see FIG. 4a-d) in such a way that they are first bent or folded over with a small radius. By moving the deformation tool 20 further in the x-direction the outer layer band portions 16-1 and 16-2 together with the second separating layer 13-1 and 13-2 are finally completely folded over (in this case by about 180° with respect to their previous position), which is shown in FIGS. 6 and 7 and is described in relation thereto in more detail hereinunder. The separating layers 12, 13 thus protect the individual band portions 16-1 and 16-2, 15-1 and 15-2, 14-1 and 14-2 from damage by the deformation tool 20. At the same time they permit slight separation of the braided work layers during deformation. The deformation tool 20 is formed in such a way that during deformation the distance between the fibres of the respective layer band portions 16-1 and 16-2, 15-1 and 15-2, 14-1 and 14-2 and the middle axis of the preform 1, which in this case extends in the longitudinal direction thereof, i.e. in the x-direction, is kept within a minimal distance.

Figure 4A:
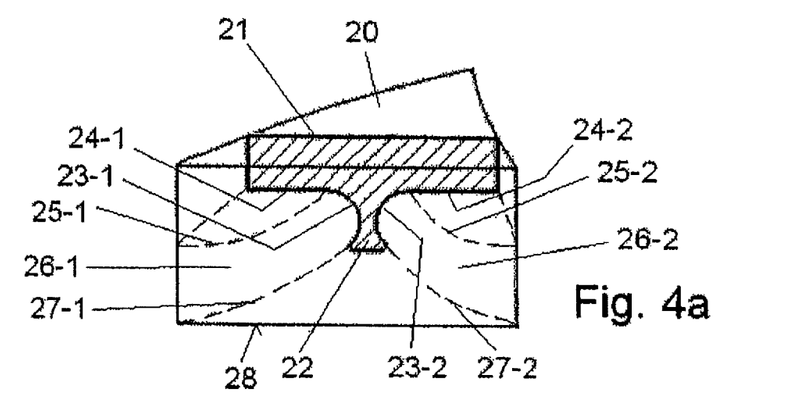
FIG. 4*a-c* illustrate schematic, perspective views of an exemplified embodiment of a deformation tool in partial cross-sections.
Figure 4B:
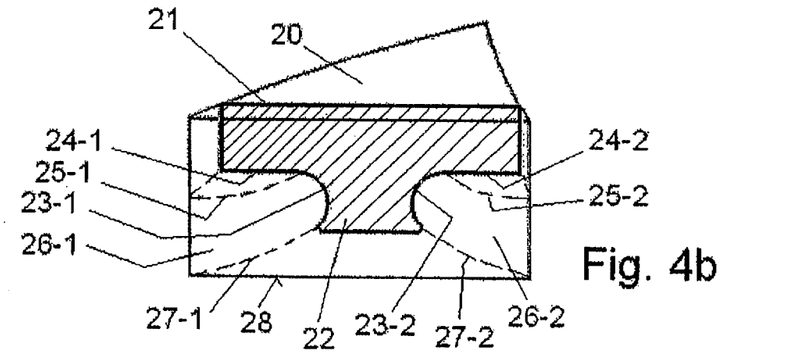
Figure 4C:
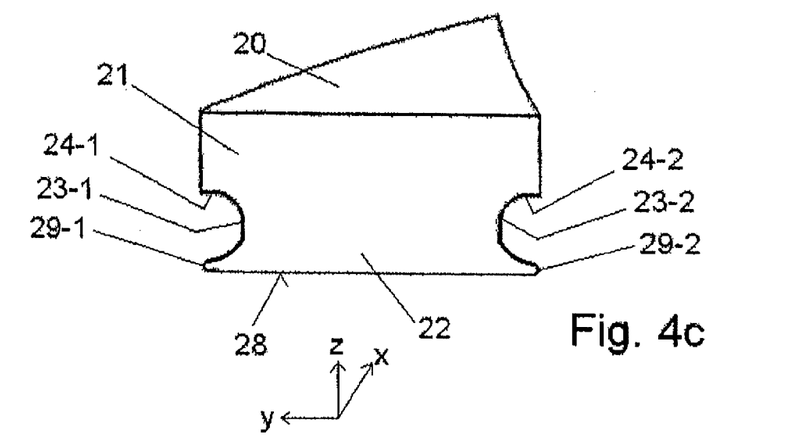
Figure 4D:
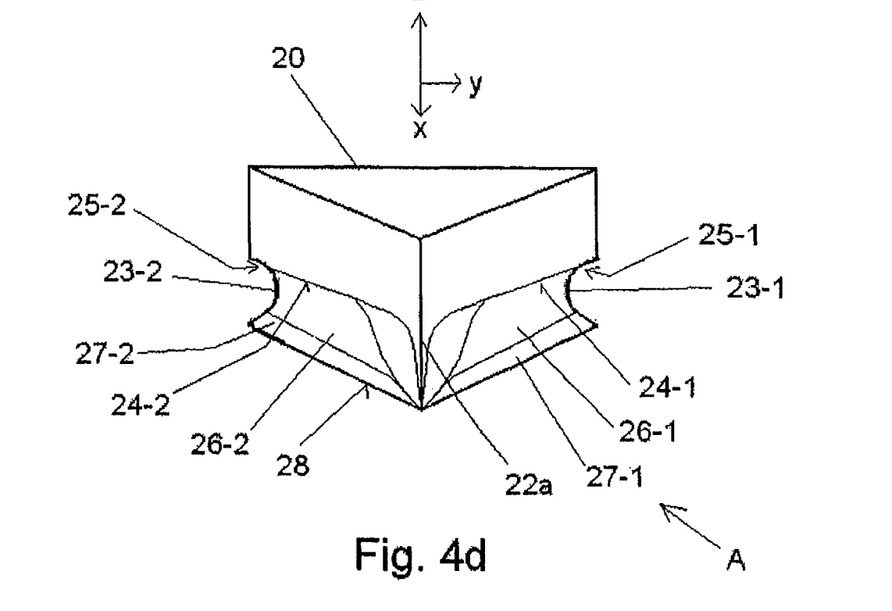
FIG. 4*d* illustrates a schematic, perspective front view of the deformation tool of FIG. 4*a-c*.

The deformation tool 20 is shown in FIGS. 4a to 4c in schematic, perspective views of an exemplified embodiment in partial cross-sections. A front view is shown in FIG. 4d.

The deformation tool 20 has a lower side 28 which is formed in an appropriately smooth manner and/or is appropriately coated to ensure the lowest possible coefficient of friction between the lower side 28 and the layer band portions 16-1 and 16-2, 15-1 and 15-2, 14-1 and 14-2 and/or the separating layers 12, 13. The deformation tool 20 is formed in the shape of a plough (in this case with two shares) or of a snowplough and is triangular in plan view. Its front face is shown in FIG. 4d and has a cutting edge 22a which, oppositely to the direction of movement (negative x-direction) of the deformation tool 20, merges into a web 22, which widens in dependence upon the x-coordinates in the negative x-direction and finally almost completely forms the rear face (FIG. 4c) of the deformation tool 20. To this end the FIGS. 4a to 4c illustrate the deformation cross-section 21 at different x-positions in the longitudinal direction of the deformation tool 20.

On both sides of the web 22, a channel 23-1, 23-2 is disposed, wherein the channel 23-1, 23-2 merges at its upper end via a channel run-out 25-1, 25-2 into a guide surface 24-1, 24-2. In the downwards direction, the channel 23-1, 23-2 is formed with a channel run-in 27-1, 27-2 and a lower edge 29-1, 29-2 which has a particularly small radius with which to engage between the layer band portions 16-1 and 16-2, 15-1 and 15-2, 14-1 and 14-2 in order to separate them from each other. The channel 23-1, 23-2 extends with a predetermined radius from the front face of the deformation tool 20 (see FIG. 4d) to its rear face (see FIG. 4c), wherein it migrates at an angle to the centre line of the deformation tool 20 (FIG. 4d) in the longitudinal direction of the deformation tool 20 outwards towards the rear face thereof, i.e. transversely in the y-direction.

Over the whole length of the deformation tool 20, the channel 23-1, 23-2 forms—together with the guide surface 24-1, 24-2, the channel run-out 25-1, 25-2 and the channel run-in 27-1, 27-2 on each long side of the deformation tool 20—a respective deformation surface 26-1, 26-2 to deform the respective layer band portion 16-1 and 16-2, 15-1 and 15-2, 14-1 and 14-2 when it is being folded over. The deformation surfaces 26-1, 26-2 are disposed symmetrically with respect to the centre line of the deformation tool 20 at an angle, wherein the centre line extends in the x-direction, i.e. the movement direction of the deformation tool 20. Corresponding to the material of the braided work layers 7, 8, 9, the deformation surfaces 26-1, 26-2 are made from a material which produces a friction pairing therewith having an extremely low coefficient of friction. For this purpose, the respective deformation surface 26-1, 26-2 can also be coated, e.g. with Teflon®, as can the lower side 28 of the deformation tool 20.

The deformation surfaces 26-1 and 26-2 are connected on a front face of the deformation tool 20 in the cutting edge 22*a*.

FIG. 4*d* shows a front view of the plough-like structure of the deformation tool 20. Other shapes are naturally possible. The cutting edge 22*a* can also be formed as a sharp cutting edge [such] that it can open up the severing cut 17 or a slit in a previously incised severing cut 17.

Figure 4E:
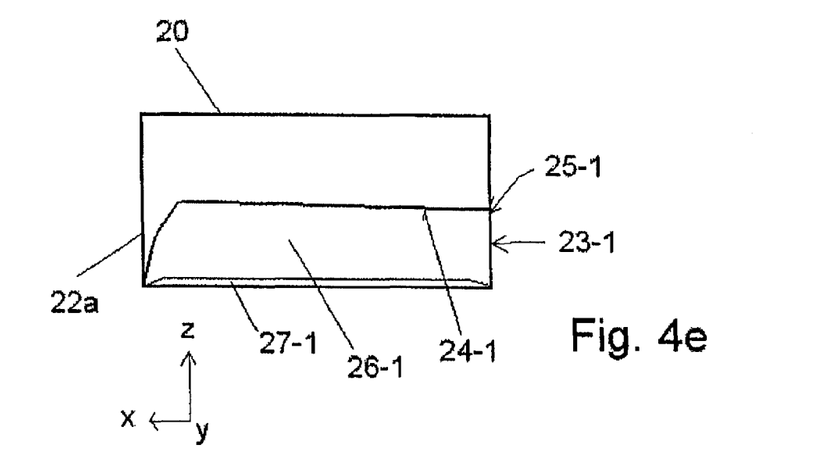
FIG. 4*e* illustrates a schematic side view in accordance with view A of the deformation tool of FIG. 4*d*.

FIG. 4*e* shows a side view A of the deformation tool 20 of FIG. 4*d*. This example shows that the guide surface 24-1 (24-2 also on the other side) extends rearwards with its outer edge from the cutting edge 22*a*, i.e. from the front face of the deformation tool 20, inclined downwards at an angle. At the cutting edge 22*a*, this outer edge of the guide surface 24-1 merges, extending downwards, into the cutting edge 22*a*.

The deformation tool 20 is guided on the deformation device 30 on a longitudinal guide (not shown) which follows the course of the preform 1, i.e. of the tool body 31. It can be driven in an automated manner, wherein advancement in the z-direction is possible in order to carry out a layer-by-layer deformation of the layer band portions 16-1 and 16-2, 15-1 and 15-2, 14-1 and 14-2.

Figure 5:
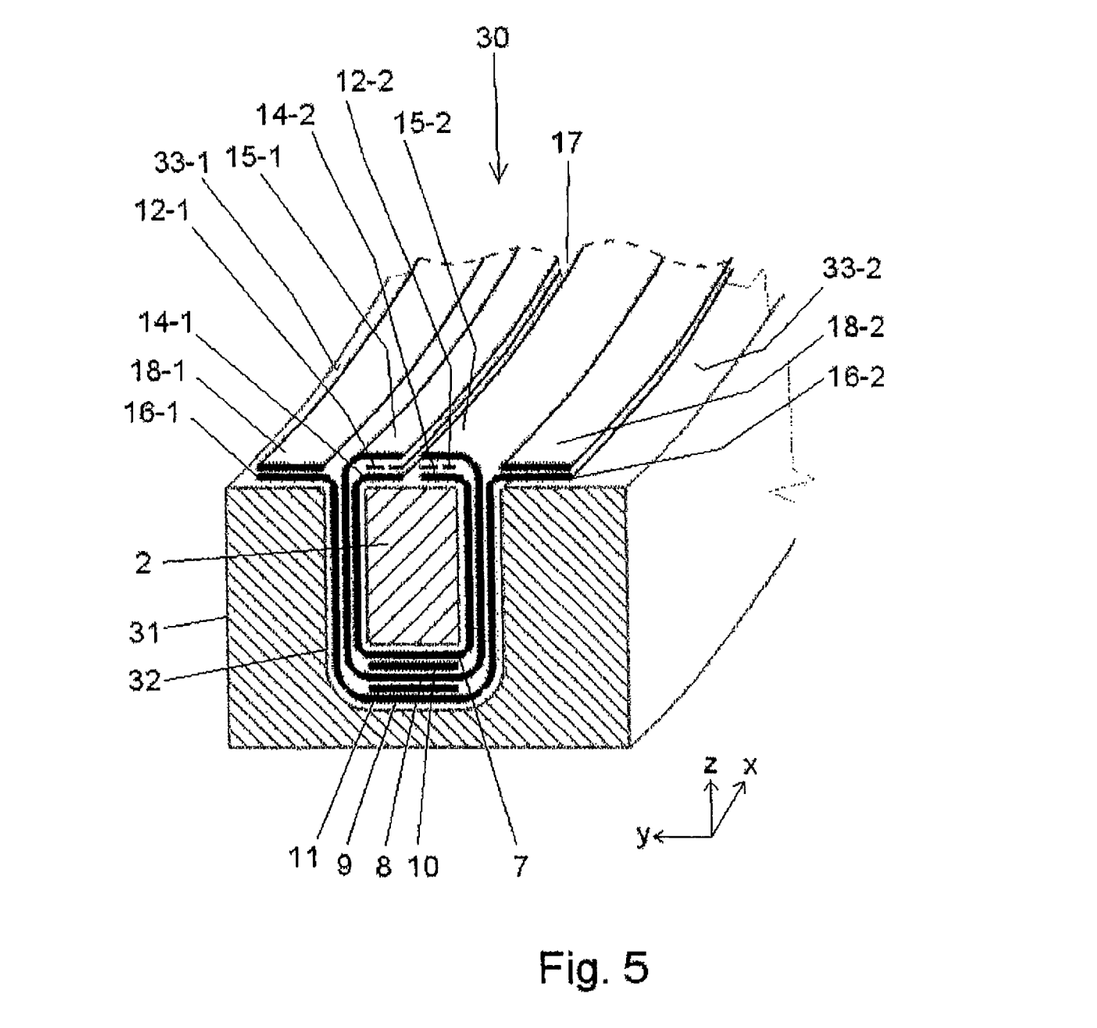
FIG. 5 illustrates the preform of FIG. 3 after a further step of the method in accordance with the invention in the deformation device in accordance with the invention.

FIG. 5 shows the preform 1 of FIG. 3 after a further step of the method in accordance with the invention in the deformation device 30 in accordance with the invention. The layer band portions 16-1 and 16-2 have been folded over by the deformation tool 20. In this example they are brought onto the upper sides of the tool 33-1 and 33-2 through about 180°. Naturally deformation by angles greater or smaller than 180° can also carried out.

The separating layer portions 13-1 and 13-2 are removed from the layer band portions 16-1 and 16-2 folded over in this manner (in this case already effected in FIG. 5) and replaced by first band layer portions 18-1, 18-2 which, by means of the laying device (not shown) are laid onto the folded-over layer band portions 16-1 and 16-2 instead of the separating layer portions 13-1 and 13-2 and are fixed. The band layer portions 18-1, 18-2 are e.g. UD fabrics prepared at another location.

The next layer band portions 15-1 and 15-2, 14-1 and 14-2 are then folded over by the deformation tool 20 with subsequent removal of the separating layer portions 12-1 and 12-2 and replacement thereof by second band layer portions 19-1, 19-2 as already described above. A deformed preform as shown in FIG. 5 is then obtained.

The deformed preform 1 thus obtained has a type of U-shaped profile or even an Ω-shaped profile.

The tool body 31 can be a component of a forming tool which can be closed for impregnation and hardening of the deformed preform 1. For this purpose the deformed preform 1 is impregnated with the matrix material in the tool body 31 and hardened e.g. in an autoclave, after which the core 2 is then removed.

A further step can consist (even before the impregnation and hardening) of the outer band 4 being severed by a second severing cut 34, from which two deformed preforms 1-1 and 1-2 with a Z-shaped profile are produced.

In this way, a deformation of a braided preform 1 with a closed cross-section can produce deformed preforms 1-1, 1-2 with a plurality of different profile shapes, wherein the advantages of the braiding technique come into their own.

Although the present invention has been described above with the aid of preferred exemplified embodiments, it is not limited thereto but can be modified in many ways.

For example, the severing cut 17 may be merely a type of layer-by-layer scoring or incising of the respective braided work layer 7 to 9 of the inner band 4, wherein the deformation tool 20 with the leading cutting edge 22*a* (FIG. 4*d*) completely opens up the incised or pre-scored severing cut 17 layer by layer.

The second severing cut 34 can also be effected at different points, which means that e.g. the resulting Z-shaped profiles are different and, in the extreme case, an L-shaped profile and a Z-shaped profile are obtained.

During deformation, it is also possible to produce components with concave (and/or convex) surfaces. For this purpose, the tool upper side 33-1, 33-2 can have concave indentations or convex protrusions at predetermined points, to which indentations and protrusions the folded-over layer band portions 16-1 and 16-2, 15-1 and 15-2, 14-1 and 14-2 can be conformed by the deformation tool 20 with a corresponding expansion e.g. pressing rolling. Thus shapes can also be produced which could not be achieved by braiding technology.

It is also feasible for the preform 1 to have only two braided work layers or even more.

It is particularly advantageous for the tool body 31 to formed in such a way that it can be used at the same time to deform the preform 1 and also for impregnation and hardening of the deformed preform.

A preform 1 with a triangular cross-section is also feasible, wherein e.g. one side forms a band to be severed and the other two sides serve as webs.

In a method for forming a structural component of an aircraft or spacecraft, a preform 1 having at least one band 4 is formed by braiding around a core 2. A severing cut 17 is introduced into the at least one band 4 of the preform 1 at least in portions in order to form two band portions 14-1, 14-2; 15-1, 15-2; 16-1, 16-2 of the at least one band 4. By means of a deformation tool 20 which can be guided along the severing cut 17, the two formed band portions 14-1, 14-2; 15-1, 15-2; 16-1, 16-2 of the at least one band 4 are then deformed into a predetermined shape. A deformation device 30 serves to carry out the method. A structural component is produced according to the method and/or by means of the deformation device.

LIST OF REFERENCE NUMERALS

1 preform
2 core
3, 4 band
5, 6 profile web
7 inner braided work layer
8 middle braided work layer
9 outer braided work layer
10, 11 band layers
12, 13 separating layers 14-1, 14-2 inner layer band portion
15-1, 15-2 middle layer band portion
16-1, 16-2 outer layer band portion
17 severing cut
18-1, 18-2 first band layer portion
19-1, 19-2 second band layer portion
20 deformation tool
21 deformation cross-section
22 web
22a cutting edge
23-1, 23-2 channel
24-1, 24-2 guide surface
25-1, 25-2 channel run-out
26-1, 26-2 deformation surface
27-1, 27-2 channel run-in
28 lower side
29-1, 29-2 lower edge
30 deformation device
31 tool body
32 receiver
33-1, 33-2 tool upper side
34 second severing cut
35, 35-1, 35-2 deformed preform
x, y, z coordinates

The invention claimed is:

1. A deformation device to form a structural component of an aircraft or spacecraft, the device comprising:
   a tool body comprising a receiver for receiving a braided preform having at least one band;
   at least one cutting device for introducing a severing cut at least in portions into the at least one band of the preform in order to form two band portions of the at least one band; and
   at least one deformation tool for guiding along the severing cut in the longitudinal direction of the tool body and of the preform to deform the two formed band portions of the at least one band into a predetermined shape, the deformation tool comprising the cutting device, and the deformation tool, in the form of a plough or a snow-plough with lateral deformation surfaces which taper towards each other in the longitudinal direction of the deformation tool at a predetermined angle, wherein they are connected at a front face of the deformation tool to form the cutting device having a cutting edge, wherein said cutting edge is oriented substantially perpendicular to a longitudinal axis of the at least one band of the preform and is adapted to introduce said severing cut along the longitudinal axis of said at least one band of the preform, wherein the deformation surfaces of the deformation tool each have a web with a channel, the channel merging at its upper end via a channel run-out into a guide surface and in a downwards direction, the channel is formed with a channel run-in, wherein over a whole length of the deformation tool, the channel forms together with the guide surface, the channel run-out and the channel run-in on each long side of the deformation tool a respective deformation surfaces to deform a respective layer band portion.

2. The deformation device as claimed in claim 1, wherein the deformation device has at least one removal device for removing separating layers from the two deformed band portions and a laying device for laying band layer portions instead of the separating layers onto the two deformed band portions.

3. The deformation device as claimed in claim 1, wherein the deformation surfaces of the deformation tool are designed to effect a predetermined deformation in the portions of the preform which are to be deformed.

4. The deformation device as claimed in claim 1, wherein the tool body is formed as a shaping tool for impregnation and hardening of a deformed preform.

* * * * *